(12) United States Patent
Ferren

(10) Patent No.: US 11,899,450 B2
(45) Date of Patent: Feb. 13, 2024

(54) SYSTEMS AND METHODS FOR CENTRALIZED CONTROL OF AUTONOMOUS VEHICLES

(71) Applicant: Applied Minds, LLC, Burbank, CA (US)

(72) Inventor: Bran Ferren, Beverly Hills, CA (US)

(73) Assignee: Applied Minds, LLC, Burbank, CA (US)

( * ) Notice: Subject to any disclaimer, the term of this patent is extended or adjusted under 35 U.S.C. 154(b) by 0 days.

(21) Appl. No.: 18/091,051

(22) Filed: Dec. 29, 2022

(65) Prior Publication Data

US 2023/0176569 A1 Jun. 8, 2023

Related U.S. Application Data

(62) Division of application No. 16/877,145, filed on May 18, 2020, now abandoned, which is a division of application No. 15/643,376, filed on Jul. 6, 2017, now Pat. No. 10,656,640.

(Continued)

(51) Int. Cl.
*G05D 1/00* (2006.01)
*B60W 50/02* (2012.01)
(Continued)

(52) U.S. Cl.
CPC .......... *G05D 1/0022* (2013.01); *B60W 50/00* (2013.01); *B60W 50/0205* (2013.01);
(Continued)

(58) Field of Classification Search
CPC .. G05D 1/0022; G05D 1/0038; G05D 1/0061; G05D 1/0088; G05D 1/024; G05D 1/0242; G05D 2201/0213
See application file for complete search history.

(56) References Cited

U.S. PATENT DOCUMENTS

2017/0088143 A1* 3/2017 Goldman-Shenhar ..................... B60K 35/00
2017/0192423 A1* 7/2017 Rust ..................... G05D 1/0038
(Continued)

FOREIGN PATENT DOCUMENTS

DE 102014015493 A1 4/2016

OTHER PUBLICATIONS

"California Driver Handbook—Turns", California Department of Motor Vehicles, May 16, 2016, https://www.dmv.ca.gov/portal/dmv/detail/pubs/hdbk/turns , 2017 , 1-5.
(Continued)

*Primary Examiner* — Yuen Wong
(74) *Attorney, Agent, or Firm* — Perkins Coie LLP; Michael A. Glenn

(57) ABSTRACT

Disclosed are systems, methods and devices for centralized control of autonomous vehicles. In some embodiments, a system and method allow an autonomous control system on-board an autonomous vehicle to pass control of the autonomous vehicle to an offboard panel of experts upon encountering an anomaly. In some embodiments, a system and method allow a regulatory entity to proactively distribute rules and requirements to autonomous vehicles while operating within a regulated space.

2 Claims, 12 Drawing Sheets

Related U.S. Application Data

(60) Provisional application No. 62/359,654, filed on Jul. 7, 2016.

(51) Int. Cl.
  B60W 50/00 (2006.01)
  B60W 60/00 (2020.01)
  G05D 1/02 (2020.01)

(52) U.S. Cl.
  CPC .... B60W 60/0053 (2020.02); B60W 60/0059 (2020.02); G05D 1/0038 (2013.01); *B60W 2050/0064* (2013.01); *B60W 2050/0215* (2013.01); *B60W 2420/403* (2013.01); *B60W 2420/52* (2013.01); *G05D 1/024* (2013.01); *G05D 1/0242* (2013.01); *G05D 2201/0213* (2013.01)

(56) References Cited

U.S. PATENT DOCUMENTS

| | | | |
|---|---|---|---|
| 2017/0192426 A1* | 7/2017 | Rust | B60W 30/00 |
| 2017/0336788 A1 | 11/2017 | Iagnemma | |
| 2018/0292820 A1 | 10/2018 | Marberger | |

OTHER PUBLICATIONS

"Deployment of Autonomous Vehicles for Public Operation" http://dmv.ca.gov/portal/dmv/detail/vr/autonomous/auto, 2017 , 2017 , 1-3.

"Right Turn on Red" , New York City Department of Transportation, 2009, http://www.nyc.gov/html/dot/downloads/ pdf/ssi09_rightonred.pdf , 2009 , 1-4.

Dougherty, Conor , "California D.M.V. Stops Short of Fully Embracing Driverless Cars" The New York Times, Dec. 16, 2015, http://www.nytimes.com/2015/12/17/technology/california-dmv-stops-short-of-fully-embracing-driverless-cars.html , 1-3.

Lambert, Fred , "Tesla reveals all the details of its Autopilot and its software v7.0" , Oct. 14, 2015; http://electrek.co/2015/10/14/ , 1-6.

Levin, Doron , "The cold, hard truth about autonomous vehicles and weather" , Fortune, Feb. 2, 2015, http://fortune.com/2015/02/02/autonomous-driving-bad-weather/ , 1-2.

Markoff, John , "For Now, Self-Driving Cars Still Need Humans" , The New York Times, 2016 Jan. 2017, http://www.nytimes.com/2016/01/18/technology/driverless-cars-limits-include-human-nature.html/ , 1-4.

* cited by examiner

SYSTEMS AND METHODS FOR CENTRALIZED CONTROL OF AUTONOMOUS VEHICLES

CROSS REFERENCE TO RELATED APPLICATIONS

This Application is a Divisional of U.S. application Ser. No. 16/877,145, filed 18 May 2020 which claims priority to U.S. Divisional application Ser. No. 15/643,376, filed 6 Jul. 2017, now U.S. Pat. No. 10,656,640, which claims priority to U.S. Provisional Application No. 62/359,654, which was filed on 7 Jul. 2016, applications referenced here are incorporated herein in their entirety by this reference thereto.

FIELD OF THE INVENTION

At least one embodiment of the present invention pertains to autonomous vehicles.

BACKGROUND

Once viewed as a futuristic technological concept that was forever over the horizon, autonomous vehicles are now widely considered an imminent inevitability. Advances in sensor technologies and control systems have spawned a proliferation of Advanced Driver Assistance Systems (ADAS) in current-generation vehicles, including adaptive cruise control (ACC), parking assistance (e.g., automatic parallel parking), blind spot monitoring and land change assistance, forward collision warning, and lane departure warning.

The even more advanced artificial intelligence systems onboard the next-generation vehicles currently under development go far beyond assistance, promising fully autonomous operation of the vehicle. Indeed the sensor and control systems onboard soon-to-be-released autonomous vehicle designs can safely navigate the vast majority of driving situations without human input at all.

Yet even the most optimistic of autonomous vehicle designers concede that substantial challenges remain. In particular, even the most advanced autonomous vehicles under development struggle to properly navigate highly anomalous, less-frequently encountered "edge cases". And despite extensive internal representations of traffic regulations, autonomous vehicles possess a limited ability to adequately respond to spatial and temporal variations in regulatory frameworks.

SUMMARY OF THE INVENTION

Disclosed are systems, methods and devices for centralized control of autonomous vehicles. In some embodiments, a system and method allow an autonomous control system-on-board an autonomous vehicle to pass control of the autonomous vehicle to an offboard panel of experts upon encountering an anomaly. In some embodiments, a system and method allow a regulatory entity to proactively distribute rules and requirements to autonomous vehicles, while the autonomous vehicles operate within an regulated space, and/or proactively distribute updated rules and requirements by which the autonomous control system onboard the autonomous vehicle can operate in one or more regions.

BRIEF DESCRIPTION OF THE DRAWINGS

One or more embodiments of the present invention are illustrated by way of example and not limitation in the figures of the accompanying drawings, in which like references indicate similar elements.

DETAILED DESCRIPTION

Figure 1:
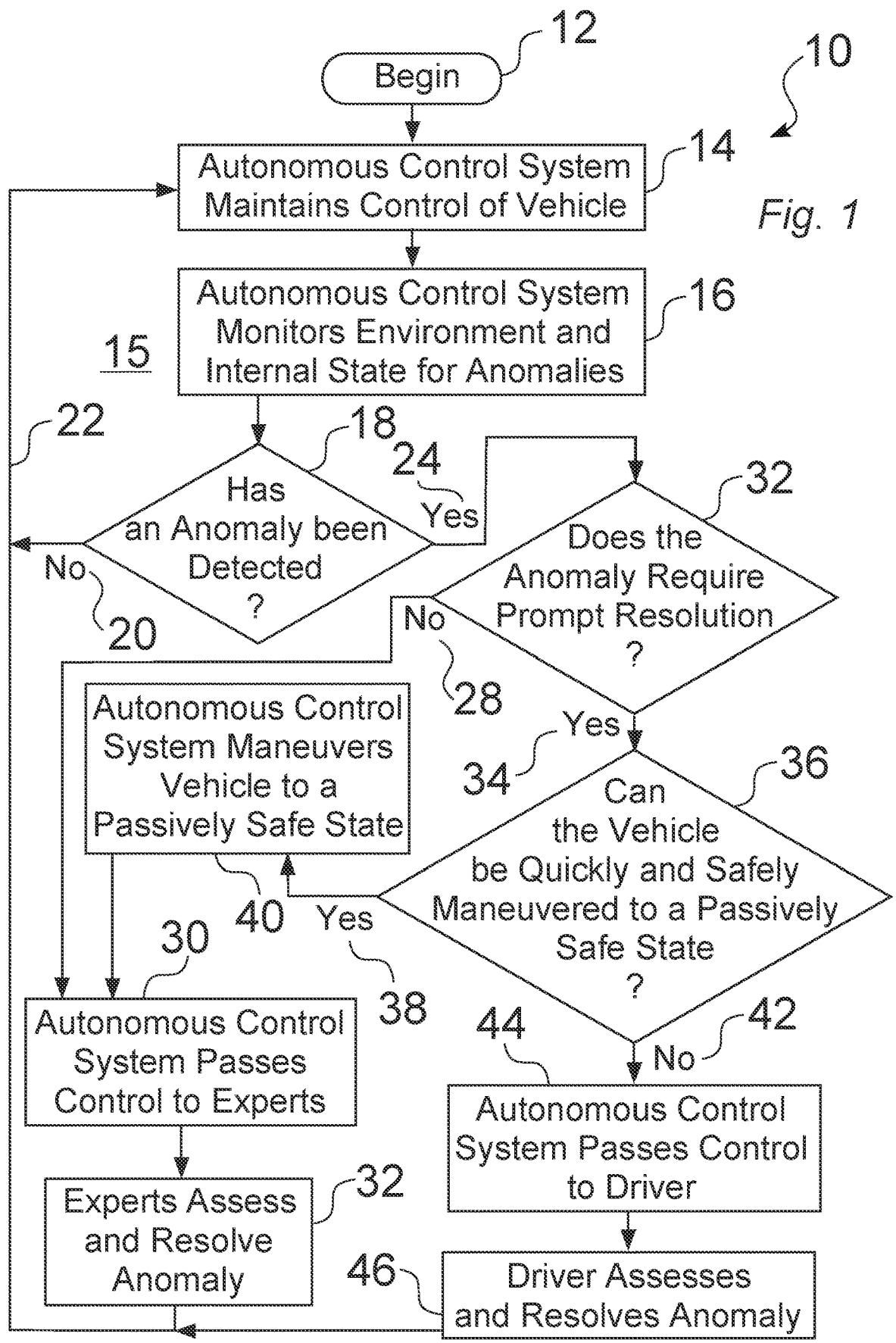
FIG. 1 is a flow chart of an illustrative method for resolution of anomalous situations via a remote panel of experts.

References in this description to "an embodiment", "one embodiment", or the like, mean that the particular feature, function, structure or characteristic being described is included in at least one embodiment of the present invention. Occurrences of such phrases in this specification do not necessarily all refer to the same embodiment. On the other hand, the embodiments referred to also are not necessarily mutually exclusive.

Introduced here are methods, systems and devices that allow centralized control of one or more autonomous vehicles that can be implemented for a wide variety of system environments and operating conditions.

In certain embodiments, the method and system can allow for an autonomous control system on-board an autonomous vehicle to pass control of the autonomous vehicle to an external entity, such as an offboard panel of experts, under one or more conditions where the autonomous vehicle encounters an anomaly.

In certain embodiments, the method and system can allow a regulatory entity to proactively distribute rules and requirements to one or more autonomous vehicles, such as when the autonomous vehicles are operating in a regulated space.

Resolution of Anomalous Situations via Remote Panel of Experts

Irregular road signs or lane markings, construction zones, detours, and even unusually-shaped or colored roadside objects and shadows can present substantial challenges to autonomous vehicle systems. Several autonomous vehicle developers have proposed (ref. "Tesla reveals all the details of its Autopilot and its software v7.0"; 2015 Oct. 14; http://electrek.co/2015/10/14/) characterizing and cataloguing such anomalies, enabling "fleet-wide" learning. But unless these approaches can abstract and internalize lessons to be applied to future anomalies, there will remain a "first time for everything". Moreover, relatively more routine anomalies, such as inclement weather, can confuse (e.g., through changes in color or contrast) if not outright obscure sensing systems (ref. "The cold, hard truth about autonomous vehicles and weather", Fortune, 2015 Feb. 2, http://fortune.com/2015/02/02/autonomous-driving-bad-weather/).

Accordingly, it appears there will be a transition period in which autonomous vehicle systems will provide considerable utility to many drivers, but will not deliver complete autonomous operation. During this period, autonomous vehicle systems will require at least occasional input or guidance from human operators in the form of "critical interventions" (ref. "For Now, Self-Driving Cars Still Need Humans", The New York Times, 216 January 2017, http://www.nytimes.com/2016/01/18/technology/driverless-cars-limits-include-human-nature.html/), when the autonomous vehicle encounters an anomaly it cannot reliably address. Consequently, the State of California has proposed regulations (ref. "Deployment of Autonomous Vehicles for Public Operation", http://dmv.ca.gov/portal/dmv/detail/vr/autonomous/auto) requiring that autonomous vehicles be operated by a licensed driver who could take over if necessary" (ref. "California D.M.V. Stops Short of Fully Embracing Driverless Cars", The New York Times, 16 Dec. 2015, http://www.nytimes.com/2015/12/17/technology/california-dmv-stops-short-of-fully-embracing-driverless-cars.html).

Obligating a human occupant to be prepared to take control of a motor vehicle, on very short notice, greatly diminishes the potential benefit of autonomous vehicles. Indeed, a primary promise of autonomous vehicle proponents has been the ability to free human drivers to deeply engage in more productive tasks while traveling from one location to another. In addition, while autonomous vehicle occupants may be aware of this obligation, many will remain tempted to engage in other activities and may be slow in responding to requests to take control. It would thus be advantageous to provide a system and method that reduces the reliance on vehicle occupants in resolving anomalies encountered by an autonomous vehicle.

As such, some embodiments of the methods and systems disclosed herein are configured to resolve anomalies encountered by an autonomous vehicle. Upon encountering an anomaly, if possible, the autonomous control system-onboard the autonomous vehicle passes control of the autonomous vehicle to an offboard, i.e., remote panel of experts that assess and resolve the anomaly. In some embodiments, the offboard panel of experts include one or more human experts. In some embodiments, additional information can be provided to the panel of experts from the autonomous vehicle to enhance the capabilities of the panel of experts. Only if necessary will the autonomous control system pass control of the autonomous vehicle to the driver. The system thus reduces the engagement and effort required of the driver, improving safety and rendering the autonomous vehicle (as perceived by the driver) more fully autonomous. In some embodiments, the panel of experts, upon identifying a known anomaly, can prompt the passage of control to the driver, or communicate the information to the autonomous control system that enables the autonomous control system to properly address the anomaly.

Figure 2:
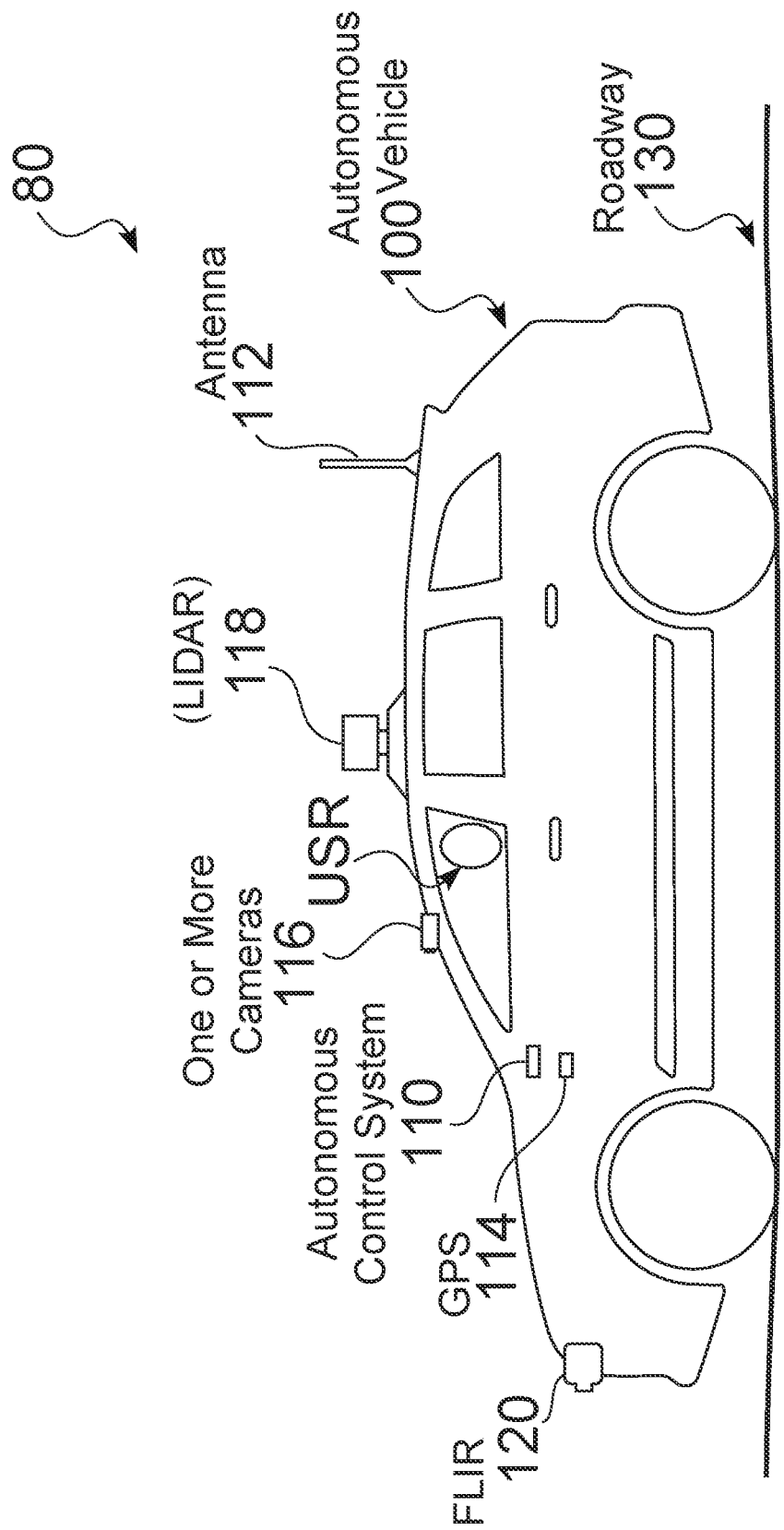
FIG. 2 is a schematic view of an illustrative autonomous vehicle.
Figure 3:
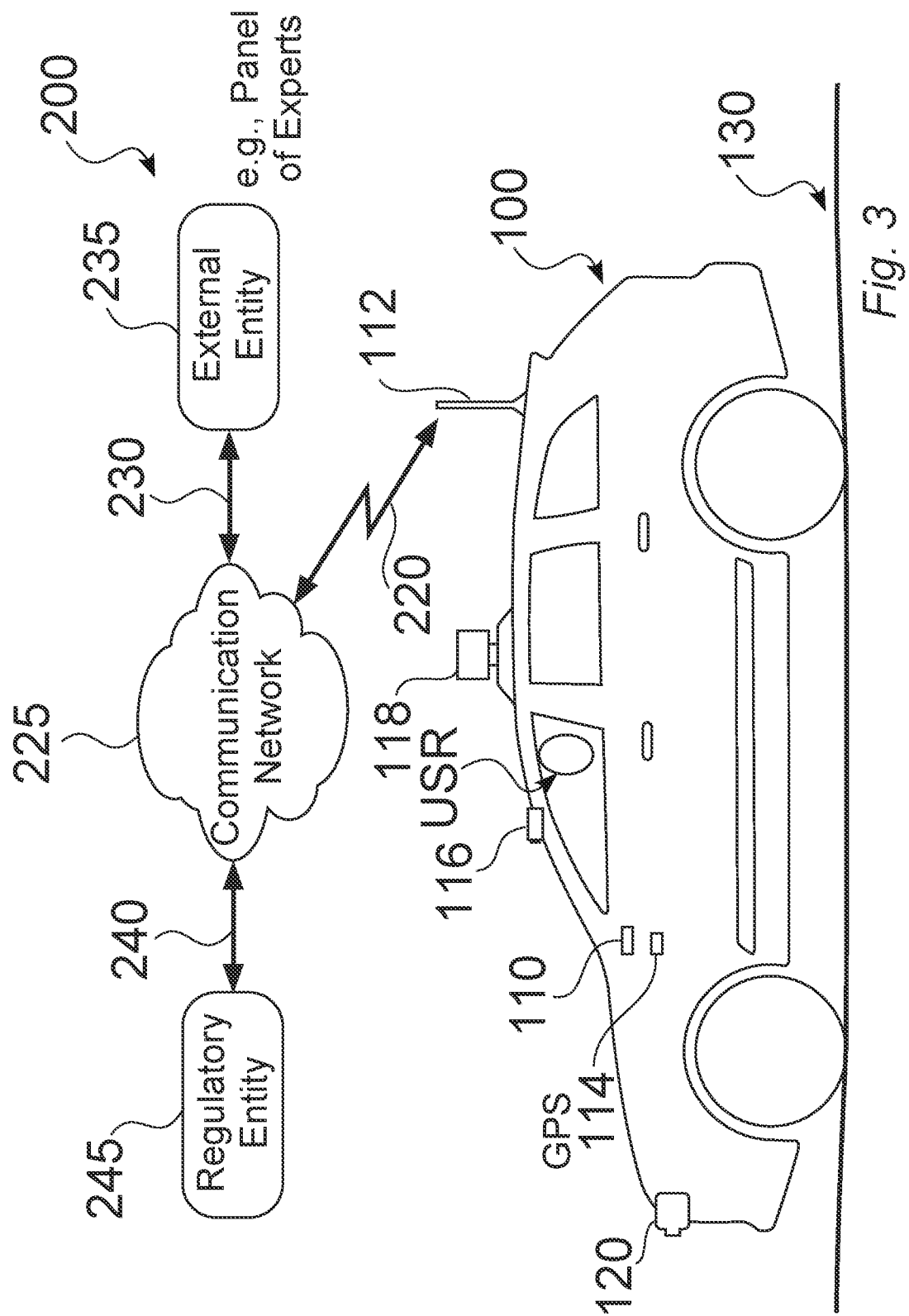
FIG. 3 is schematic view of an illustrative system for centralized control of an autonomous vehicle.

FIG. 1 is a flow chart of an illustrative method 10 for resolution of anomalous situations via a remote panel of experts 235 (FIG. 3). Operation of the system begins 12 when an autonomous control system 110 (FIG. 2) associated with an autonomous vehicle 100 (FIG. 2), enters into a control loop 15. The illustrative autonomous control system 110 seen in FIG. 4 includes a processor 302 (FIG. 4) connected to a memory 304 (FIG. 4), and is typically connected to a communication module 305 (FIG. 4), such as including a transceiver 306 (FIG. 4) that is connected to an antenna 112 (FIG. 2) for sending and receiving wireless signals 220 (FIG. 3).

Figure 8:
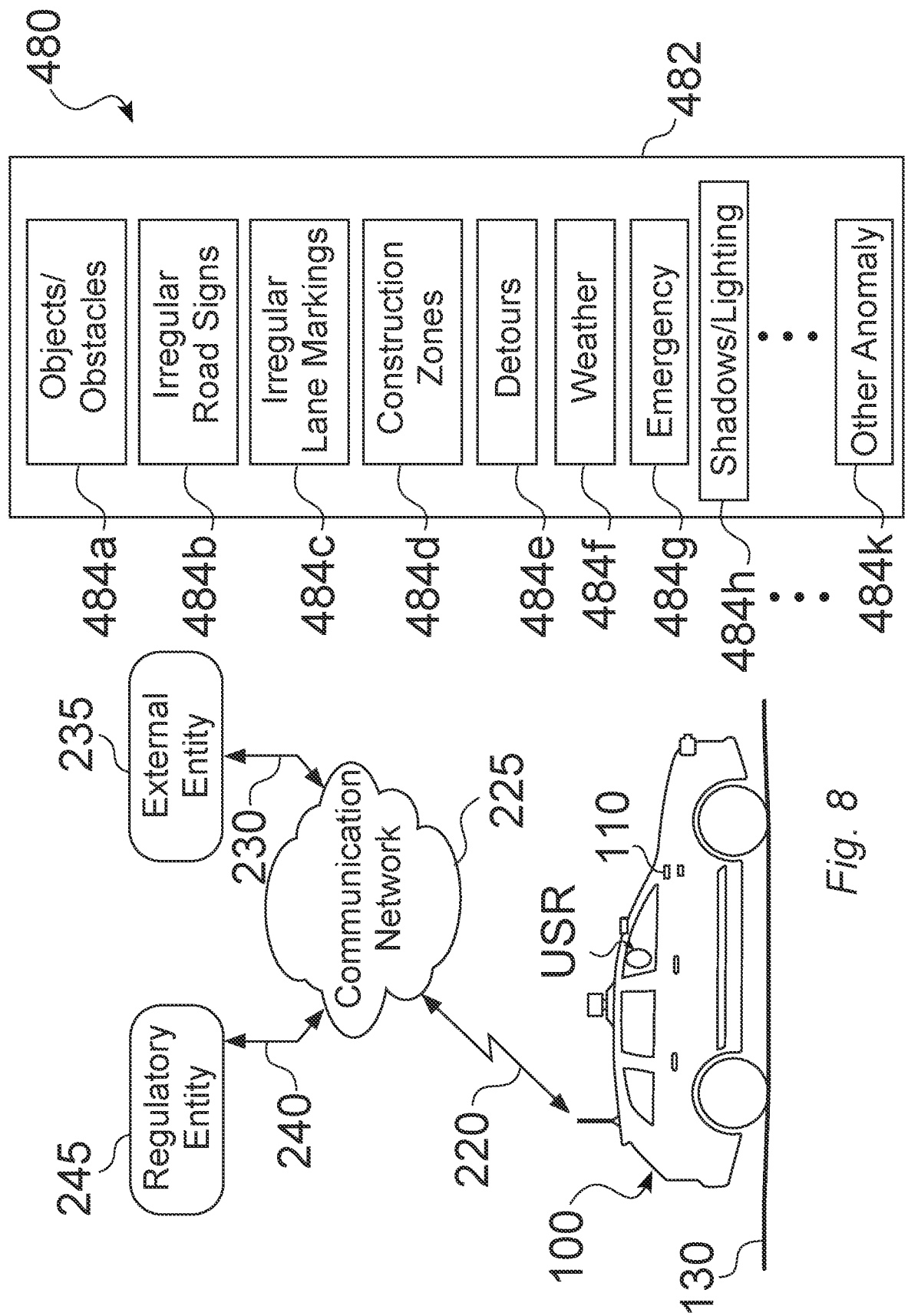
FIG. 8 is a block diagram of illustrative anomalies that can be encountered during autonomous operation of one or more vehicles, which can be determined or sensed by any of the autonomous vehicles, or by the external entity.

As further seen in FIG. 1, the autonomous control system 110 continuously maintains control 14 of the autonomous vehicle 100, and periodically monitors 16 the environment and its internal state for anomalies 484, e.g., 484a-484k (FIG. 8).

If the method determines 18 that an anomaly 484 is not detected 20, the autonomous control system 110 continues 22 to maintain operation of the autonomous vehicle 100, by implementing control loop 15. If it is determined 18 that an anomaly 484 is detected 24, the illustrative autonomous control system 110 determines 32 if the detected anomaly 484 requires prompt attention or resolution. If not 28, the autonomous control system 110 passes control 30 of the autonomous vehicle 100 to an external entity 235, e.g., a panel of experts 235, wherein the panel of experts 235 can assess and resolve 32 the anomaly 484, and when safe to do so, the method 10 returns control 22 to the autonomous control system 110 for operation within the control loop 15.

If it is determined 32 that the detected anomaly 484 requires prompt resolution 34, the autonomous control system 110 determines 36 if the autonomous vehicle 100 can be quickly and safely maneuvered to a passively safe state. If so 38, the autonomous control system 110 maneuvers 40 the autonomous vehicle 100 to the passively safe state, and then passes 30 control of the autonomous vehicle 100 to the panel of experts 235, to assess and resolve 32 the anomaly 484, and when safe to do so, the method 10 returns control 22 to the autonomous control system 110 for operation of the autonomous vehicle 100 within the control loop 15.

If the autonomous control system 110 determines 36 that the autonomous vehicle 100 cannot 42 be quickly and safely maneuvered to a passively safe state, the autonomous control system 110 passes 44 control of the autonomous vehicle 100 to the driver USR (FIG. 2), at which point the driver USR can proceed 46 to assess and resolve the specific anomaly 484, and when safe to do so, the driver USR can return control 22 to the autonomous control system 110 for operation of the autonomous vehicle 100 within the control loop 15.

FIG. 2 is a schematic view 80 of an illustrative autonomous vehicle 100, such as located in a region 402 (FIG. 6) of operation, in which such a region 402 typically includes one or more roadways 130.

The illustrative autonomous vehicle 100 seen in FIG. 2 includes an autonomous control system 110 that can be linked to onboard systems 308 (FIG. 4), such as including the power system 310, i.e., the engine or motor, the electrical system 312, the braking system 314, the steering system 316, the communications system 318, an offboard and/or onboard global position system (GPS) 114, one or more cameras 116, a forward looking infrared (FLIR) camera 120, a light detection and ranging (LIDAR) sensor 118, as well as any other vehicle systems.

FIG. 3 is schematic view of an illustrative system 200 for centralized control of an autonomous vehicle 100. The autonomous vehicle 100 seen in FIG. 2 and FIG. 3 can communicate 220, such as over one or more communication networks 225, to send and/or receive information. For instance, the illustrative autonomous vehicle 100 seen in FIG. 2 and FIG. 3 can communicate 230 with an offboard panel of experts 235, and in some embodiments can communicate 240 with a regulatory entity 245.

Figure 4:
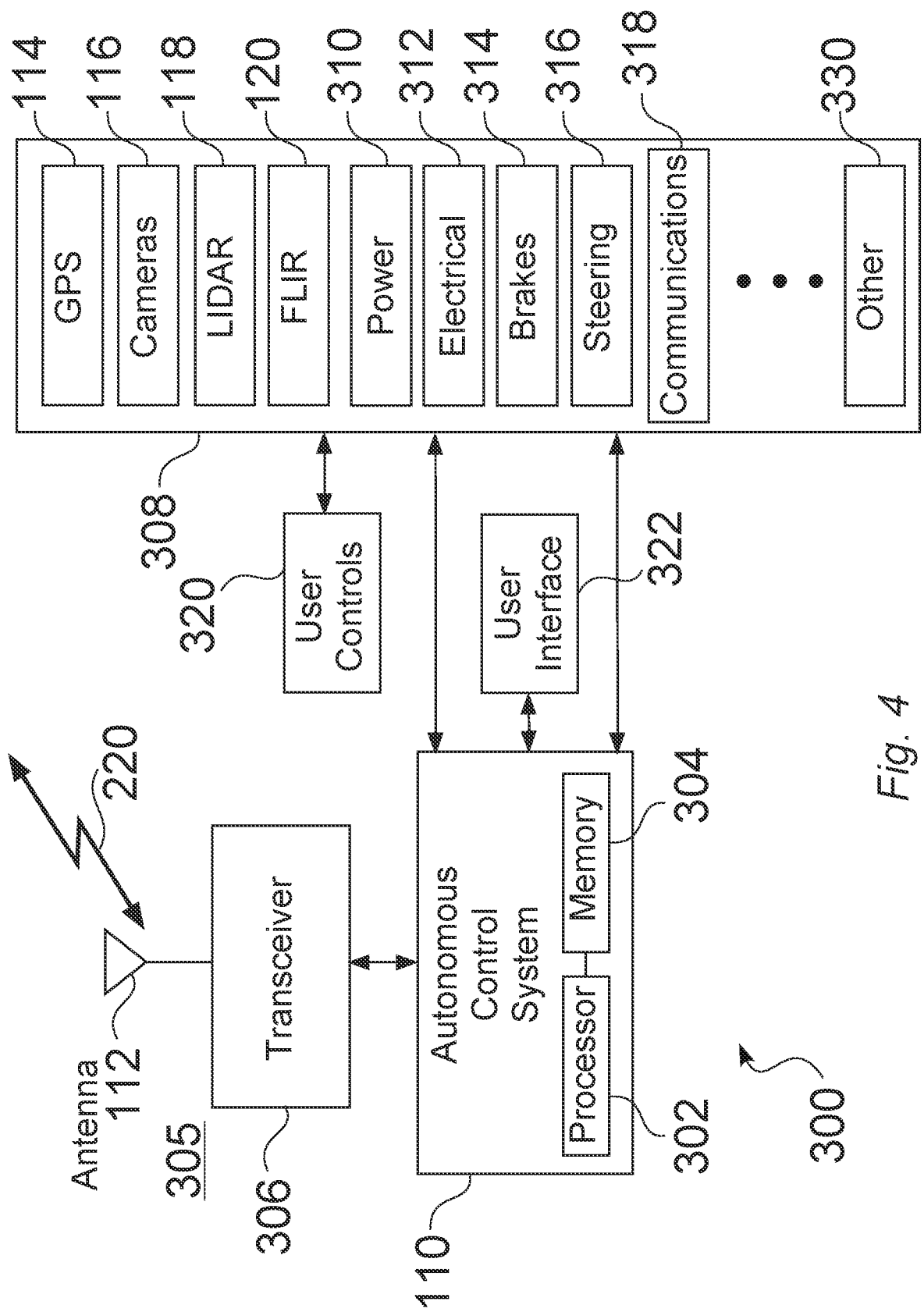
FIG. 4 is a schematic diagram of an illustrative autonomous control system integrated with a vehicle.

FIG. 4 is a schematic diagram 300 of an illustrative autonomous control system 110 integrated with an autonomous vehicle 100, wherein the autonomous vehicle 100 includes user controls 320 for interaction with one or more vehicle systems 308, and a user interface 322 for interaction with the autonomous control system 110.

Figure 5:
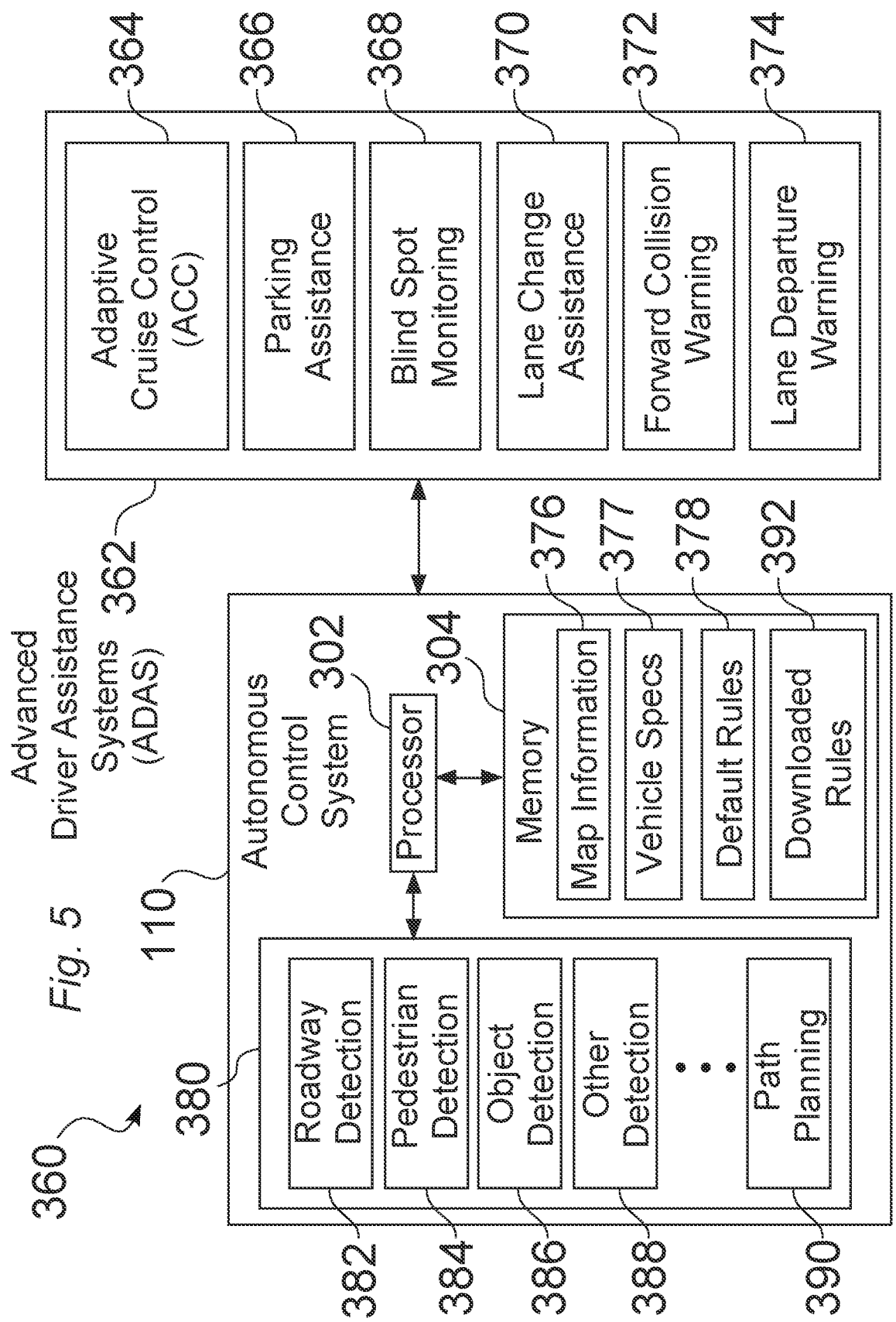
FIG. 5 is a schematic diagram of an illustrative autonomous control system that is functionally integrated with an advanced driver assistance system (ADAS).

FIG. 5 is a schematic diagram 360 of autonomous functions that can be provided by an illustrative autonomous control system 110, such as using one or more functional modules 380, and other determined or stored information. For instance, any of maps 376, vehicle specifications 377, or default rules of operation 378 can be stored within the memory 304, while the autonomous control system 110 can include any of roadway detection 382, pedestrian detection 384, object detection 386, and/or other detection 388.

In some embodiments, the illustrative autonomous control system 110 can be functionally integrated with an advanced driver assistance system features (ADAS) 362, which can include any of adaptive cruise control (ACC) 364, parking assistance (e.g., automatic parallel parking) 366, blind spot monitoring 368, lane change assistance 370, forward collision warning 372, and lane departure warning 374.

Figure 6:
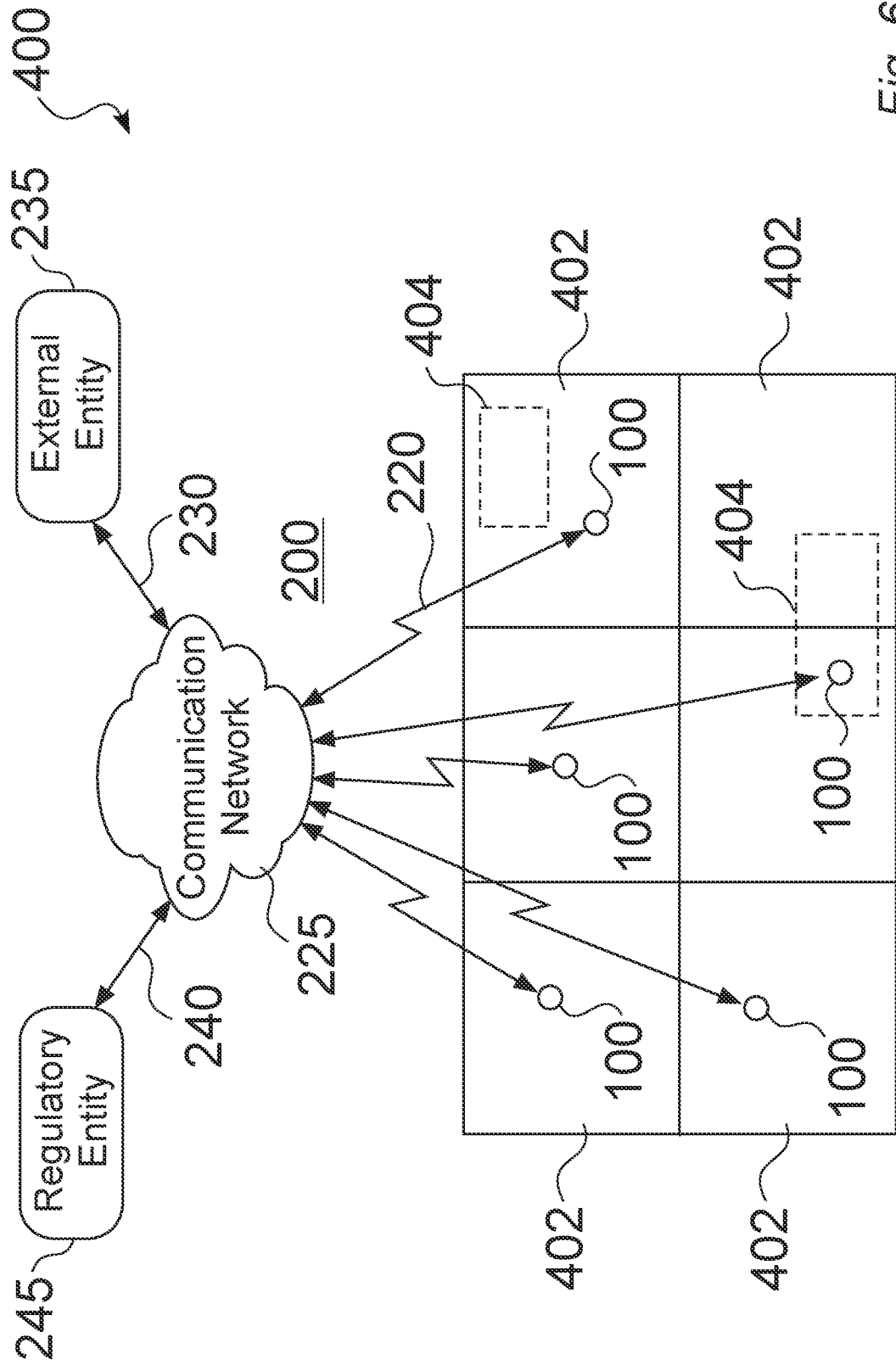
FIG. 6 shows a centralized system in communication with vehicles operating in any of one or more regions and/or regulated spaces.
Figure 7:
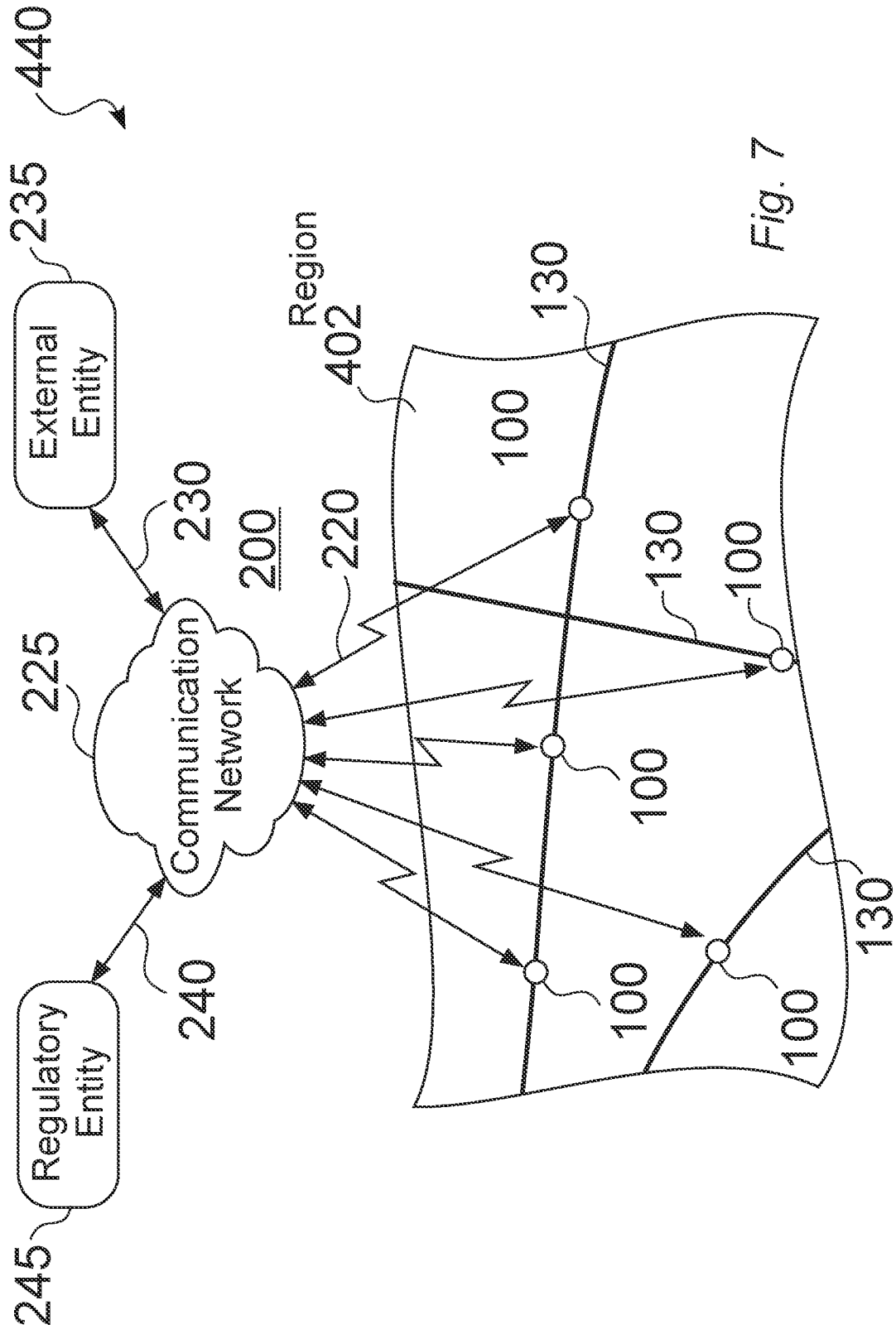
FIG. 7 is a schematic view of centralized operation of one or more vehicles within a region.

FIG. 6 is functional view 400 of an illustrative centralized system 200 in communication with autonomous 100 vehicles operating in any of one or more regions 402 and/or regulated spaces 404. FIG. 7 is a schematic view 440 of centralized operation of one or more autonomous vehicles 100 within at least a portion of an illustrative region 402, such as with respect to one or more roadways 130.

FIG. 8 is a schematic diagram 480 of illustrative anomalies 484, e.g., 484a-484k, that can be encountered during autonomous operation of one or more autonomous vehicles 100, wherein the anomalies 484 may be determined or sensed by any of one or more of the autonomous vehicles 100, by the panel of experts 235, or in some circumstances by a regulatory entity 245. The illustrative set 482 of anomalies 484 seen in FIG. 8 that may be encountered by an autonomous vehicle 100 include any of objects or obstacles 484a, irregular road signs 484b, irregular lane markings 484c, construction zones 484d, detours 484e, weather 484f, emergency conditions 484g, shadows and/or lighting 484h, or other anomalies 484k.

Generally, the autonomous control system 110 can be configured to detect one or more anomalies 484, such as when the autonomous vehicle 100 and integrated autonomous control system 110 encounters environmental conditions, or attains an internal state under which it can no longer ensure, to an acceptable level of certainty, safe control of the autonomous vehicle 100.

For example, in some embodiments, the autonomous control system 110 can detect an outage of one or more sensors or information sources. In an illustrative situation, a LIDAR sensor 118 may be temporarily occluded, or a network outage may prevent receipt, e.g., via communication pathway 220, of map information 376 (FIG. 5).

In another circumstance, the autonomous control system 110 can detect inconsistencies between multiple environmental sensors. For example, the autonomous control system 110 may detect an unacceptably low level of agreement between a LIDAR unit 118 and a forward looking infrared (FLIR) camera 120.

In another scenario, the autonomous control system 110 may detect inconsistencies between direct observations and internal models of the environment 130. For instance, the autonomous control system 110 may detect an unacceptably low level of agreement between the direction expected for a roadway 130, such as based on an internal map 376 (FIG. 5), and a roadway direction as actually determined, such as by a roadway detection module 382 (FIG. 5), using an edge detection algorithm, operating on a forward looking video camera 116.

In some operating situations, the autonomous control system 110 may detect low levels of confidence in determinations made by one or more its processing modules 380. For example, the roadway detection module 382 may report a low level of certainty in its estimate of the far-field roadway location, or a pedestrian detection module 384 may report a high degree of uncertainty in the position of a previously detected and tracked pedestrian.

In some situations, the autonomous control system 110 may detect that a prior action has not had the expected effect. For example, the autonomous control system 110 may determine that an evasive maneuver to avoid a particular detected object 484a, such as by an object detection module 386 (FIG. 5), has not in fact changed the position of the autonomous vehicle 100 relative to the detected object 484a, suggesting that the autonomous control system's understanding of the environment is flawed, and/or that the current, i.e. updated, position of the object 484a requires a further evasive maneuver.

In some embodiments, if an anomaly 484 is detected, the autonomous control system 110 can determine 32 (FIG. 1) whether the anomaly 484 requires prompt resolution. For example, the autonomous control system 110 can consider the maximum tolerable duration of a particular sensor outage, or the forward speed of the autonomous vehicle 100, in combination with the distance to a spatial anomaly 484.

If the anomaly 484 requires prompt resolution 34 (FIG. 1), the autonomous control system 110 can then determine 36 whether the autonomous vehicle 100 can be quickly and safely maneuvered 40 to a passively safe state. A passively safe state is one that affords a substantial period of additional time within which to resolve the anomaly 484. For example, maneuvering 40 to a passively safe state may include a substantial reduction in speed along a straight and clear roadway 130, or a full stop of the autonomous vehicle 100 outside the flow of traffic. If such a maneuver can be performed 38 (FIG. 1), the autonomous control system 110 can perform the maneuver 40 (FIG. 1) to bring the autonomous vehicle 100 to a passively safe state.

After the autonomous vehicle 100 has reached a passively safe state, or if the autonomous control system 110 determines that the anomaly 484 does not require 28 prompt resolution, the autonomous control system 110 passes control 30 of the autonomous vehicle 100 to an offboard panel of experts 235.

Figure 9:
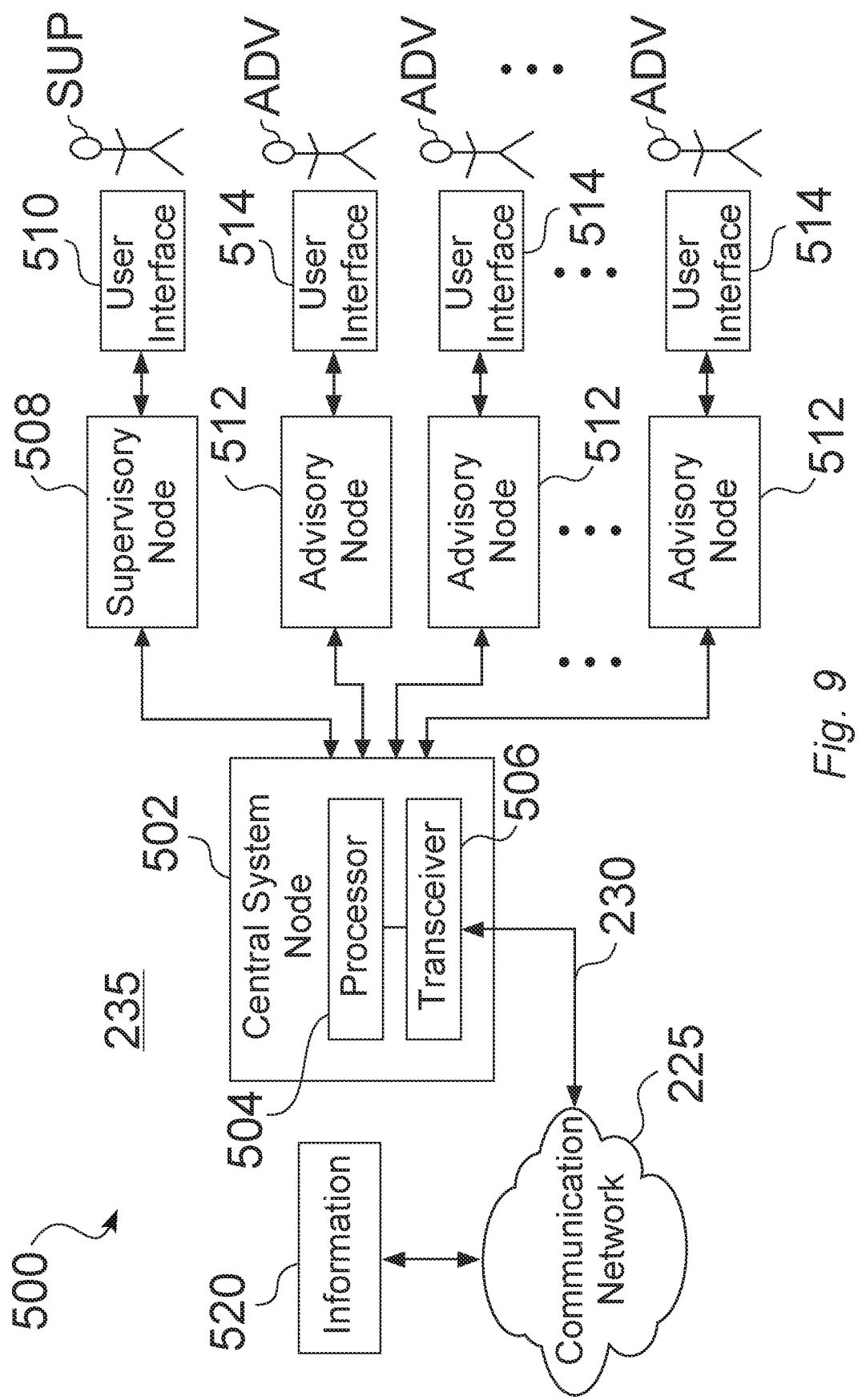
FIG. 9 shows illustrative system architecture configured for an external panel of experts.

FIG. 9 shows illustrative system architecture 500 configured for an external panel of experts 500, such as implemented with one or more computers. For instance, the illustrative expert system architecture 500 seen in FIG. 9 includes a central system node 502, such as including a processor 504 and a transceiver 506 for communication 230 over a communication network 225.

The illustrative central system node 502 seen in FIG. 9 is also interconnected to one or more expert nodes 508,512, such as including a supervisory node 508, and one or more advisory nodes 512. Each of the nodes 508, 512 can correspond to an expert, such as a supervisory expert SUP associated with the supervisory node 508, and advisory experts ADV associated with corresponding advisory nodes 512. The illustrative supervisory node 508 seen in FIG. 9 includes a corresponding user interface 510 for interaction with the supervisory expert SUP, while the illustrative advisory nodes 512 each include a corresponding user interface 514 for interaction with the advisory experts ADV.

Figure 10:
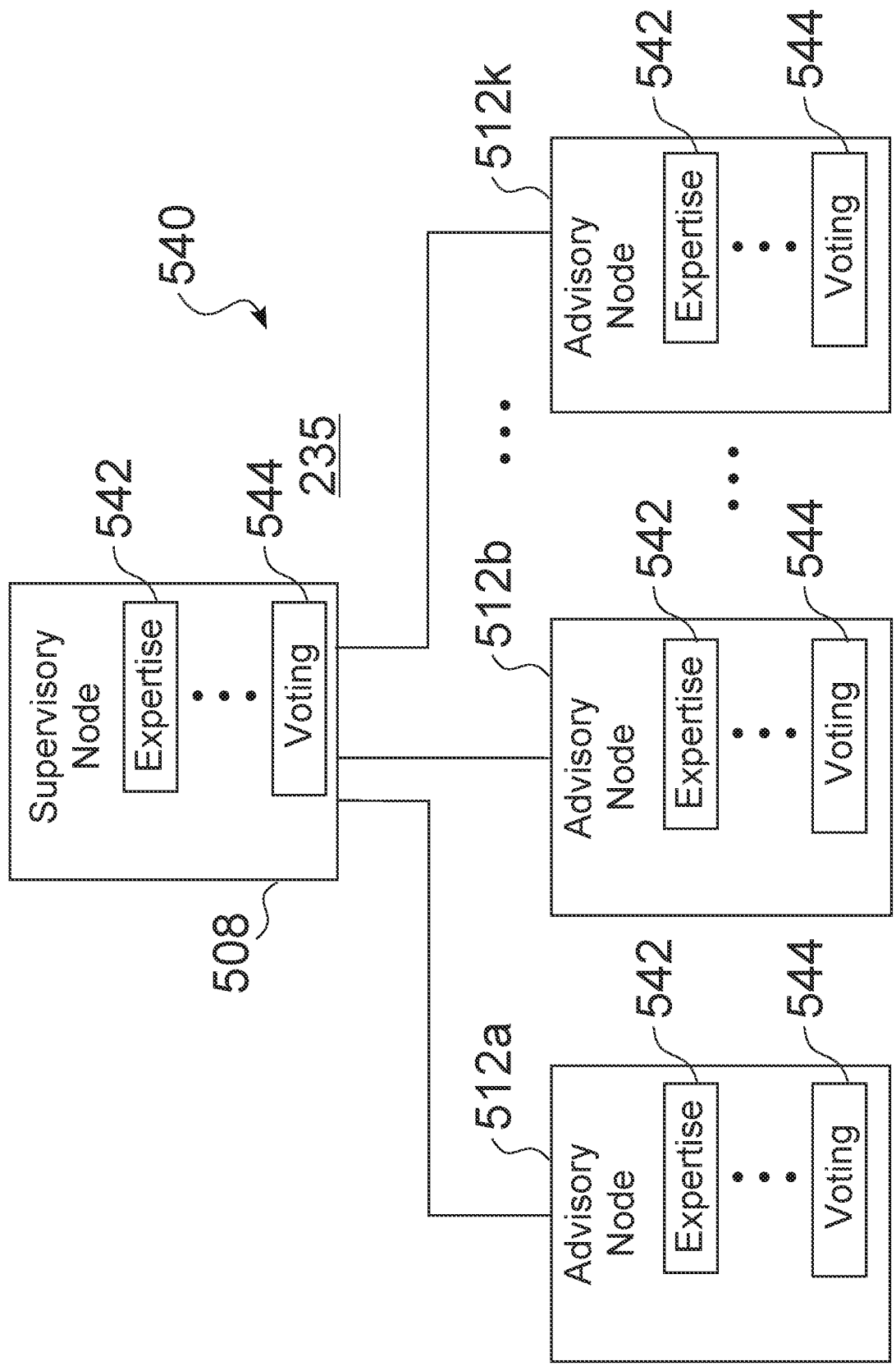
FIG. 10 shows an illustrative hierarchy between a supervisory expert and one or more advisory experts.

FIG. 10 shows an illustrative hierarchy 540 between a supervisory expert SUP at a supervisory node 508, and one or more advisory experts ADV at corresponding advisory nodes ADV. As such, in some embodiments, the offboard panel of experts 235 can comprise one or more humans SUP, ADV (FIG. 10) at a centralized, remote location. One or more members of the panel of experts 235 may be assigned to resolve the detected anomaly.

As seen in FIG. 10, the panel of experts 235 can include a hierarchy 540, such as between an advisory node 512, e.g., 512a, wherein an advisor ADV, such as having associated expertise 542, analyzes one or more operational factors, and a supervisory node 508, in which a supervisor SUP has a higher decision making authority over one or more advisory experts ADV. In some embodiments, a decision from the panel of experts 235 is based on a vote 544 between a plurality of experts 508,512, such as input within a time threshold, which can also be weighted based on the expertise 542 and hierarchy of the experts 508, 512.

In some embodiments, the autonomous control system 110 passes as much information as possible to the offboard panel of experts 235. For example, the autonomous control system 110 may indicate the specific anomaly 484 detected, and the one or more reasons the anomaly 484 was detected. In some embodiments, the autonomous control system 110 can also provide the feed signal of a live camera, e.g., 116, as well as imagery prior to anomaly detection. In some embodiments, the autonomous control system 110 can also provide additional raw data (e.g., light level, temperature, or humidity readings) or interpreted sensor information (e.g., depth maps and roadway or pedestrian detections). In some embodiments, relevant information from other sources can be used to supplement information 520 (FIG. 9) received from the autonomous control signal, such as weather information, traffic information, information received from other autonomous vehicles 100 in the same area, other camera feeds from the area, updated road conditions, and/or emergency information.

The offboard panel of experts 235 can resolve the anomaly 484 using one or more of several possible approaches. For example, under some circumstances, the offboard panel of experts 235 may immediately determine that there is in fact no anomaly 484. In some situations, the offboard panel of experts 235 can advise the autonomous control system 110 to ignore raw or interpreted sensor information that the offboard panel of experts 235 determines to be spurious. In other situations, the offboard panel of experts 235 can instruct the autonomous vehicle 100 to maneuver itself 40 (FIG. 1) to a passively safe state. Given sufficient onboard sensor capability (e.g., video feeds) and bandwidth between the autonomous vehicle 100 and the offboard panel of experts 235, in some embodiments, the offboard panel of experts 235 can remotely operate the autonomous vehicle 100 for an extended period of time.

After adequately assessing and fully resolving an anomaly 484 using one or more of these or other approaches, the offboard panel of experts 235 can pass control 22 of the autonomous vehicle 100 back to the autonomous control system 110. Alternatively, if the offboard panel of experts 235 determines that the anomaly 484 cannot be successfully addressed remotely, it may request assistance from the driver USR of the autonomous vehicle 100 (such as through the user interface 322 (FIG. 4)), or pass control of the autonomous vehicle 100 to the driver USR. Under such circumstances, some embodiments of the system 200 and method 10 can notify the driver USR of the situation, such as through auditory and or visual alerts through the user interface 322, and in some embodiments can provide automated or human-based communication with the driver USR.

In some situations, the system 200 and method 10 can notify the driver USR of a pending situation 484, e.g., through user interface 322 (FIG. 4), in which the driver USR may soon need to assume control of the autonomous vehicle 100, such as during analysis of the anomaly 484 by the panel of experts 235, but before a decision is reached by the panel 235. In such a scenario, the driver USR or other passengers may be notified that supplementary information may be requested by the expert panel 235, such as related to the current anomaly 484, or the current status of the driver USR.

Detailed Examples

Operation of the method and corresponding system as outlined in FIG. 1 can be better understood through consideration of detailed examples.

In a first example, an autonomous vehicle 100 under control of the autonomous control system 110 traveling a residential street 130 encounters a body of water 484a (FIG. 8) spanning the width of the roadway 130. In this example, the autonomous control system 110 detects an anomaly 484a when a path planning module 390 (FIG. 5), based on an analysis of the roadway roughness and visual textures, reports a low level of confidence that the proposed path is safely traversable. Because the autonomous vehicle 100 is rapidly approaching the body of water 484a, the autonomous control system 110 determines 32 that the anomaly 484a requires prompt resolution 34. Based on low levels of surrounding traffic and the presence of an open parking lane alongside the roadway 130, the autonomous control system 110 determines 36 that the autonomous vehicle 100 can quickly and safely maneuver 40 to a passively safe state. The autonomous control system 110 maneuvers 40 the autonomous vehicle 100 to a standing position within the parking lane. The autonomous control system 110 then passes 30 control of the autonomous vehicle 100 to the offboard panel of experts 235, provides a live video feed, and indicates the proposed (but deemed uncertain) path through the body of water 484a. In some embodiments, the offboard panel of experts 235 can watch other vehicles pass through the body of water, and conclude it is merely a shallow puddle. As such, in this example, the offboard panel of experts 235 can transmit instructions to the autonomous control system 110 to proceed on the proposed path, and passes control 22 of the autonomous vehicle 100 back to the autonomous control system 110. In some embodiments, the offboard panel of experts 235 can consider relevant information regarding the capabilities and/or limitations, e.g., vehicle specifications 337 (FIG. 5) of the autonomous vehicle 100, or any difference between the autonomous vehicle 100 and other vehicles, e.g., ground clearance, vehicle weight, vehicle size, available power, air intake height, etc.). In this manner, the system 200 may result in a decision that is appropriate for the specific autonomous vehicle 100. For example, even if it is observed that a 4-wheel drive truck was able to successfully navigate the body of water 484*a*, a specific smaller autonomous vehicle 100 may not be so able, and the offboard panel of experts 235 can respond accordingly.

In another example, an autonomous vehicle 100 under control of the autonomous control system 110 and traveling a remote, rural highway 130, passes through a swarm of insects. Debris from impacted insects coats and occludes an aperture of the LIDAR 118 unit atop the autonomous vehicle 100. The autonomous control system 110 detects an anomaly 484 when it determines that the depth map from the LIDAR 118 is compromised. The autonomous control system 110 detects no nearby traffic and the route ahead is straight and on well-maintained roads. The autonomous control system 110 determines that the autonomous vehicle 100 can safely proceed for a substantial distance relying solely upon a lane detection algorithm analyzing textures and lane markings as seen via onboard video cameras, e.g., 116. The autonomous vehicle 100 can therefore be directed to proceed onward while the autonomous control system 110 passes control to the offboard panel of experts 235. The autonomous control system 110 provides the offboard panel of experts 235 with a live video feed and the depth map that was determined to be compromised. Based on the depth map (or lack thereof), the offboard panel of experts 235 concludes that the LIDAR unit 118 has been completely occluded. The offboard panel of experts 235 can safely guide the autonomous vehicle 100 to a parked position alongside the roadway 130, and can instruct the driver USR of the autonomous vehicle 100 to visually inspect the LIDAR unit 118. If and when the driver USR or other person, e.g., another passenger or a service station attendant, clears the insect debris from the LIDAR unit 118, the offboard panel of experts 235 can receive an improved depth map. The offboard panel of experts 235 can then declare the anomaly 484 to be resolved, and pass control 22 of the autonomous vehicle 100 back to the autonomous control system 110.

Alternative Embodiments

In various alternative embodiments, the autonomous control system 110 can bypass the determining 36 if the autonomous vehicle 100 can be quickly and safely maneuvered to a passively safe state. Instead, if the anomaly 484 requires prompt resolution, the autonomous control system 110 can directly pass control to the driver USR. In some embodiments, determining 36 if the passively safe state is safely and quickly attainable under control of the autonomous control system 110 is preferable, however, in that it reduces the number of anomalies 484 that will ultimately require assistance from the driver USR of the autonomous vehicle 100.

In other alternative embodiments of the method 10 and system 200, the autonomous control system 110 can consider one or more time thresholds while awaiting resolution of the anomaly 484 by the offboard panel of experts 235. For example, if the autonomous control system 110 determines 32 that the anomaly 484 does require 34 prompt resolution, it may afford the offboard panel of experts 235 only a brief period of time before either (a) attempting to maneuver 40 the autonomous vehicle 100 to a passively safe state or (b) passing 44 control to the driver USR. If the autonomous control system 110 determines 32 that the anomaly 484 does not require 28 prompt resolution or maneuvered 40 the autonomous vehicle 100 to a passively safe state, the system 200 may afford the offboard panel 235 a relatively longer period of time before passing 44 control to the driver USR. In either case, considering the time thresholds ensures more reliable operation in the event of a communications network delay or outage.

As described above, the monitoring 16 for anomalies 484, as seen in FIG. 1, can be performed by the autonomous control system 110 based strictly on locally sensed information and the internal state. In some alternative embodiments, the autonomous control system 110 can be explicitly informed of an anomaly 484 from an exterior information source 520, e.g., (FIG. 9) or authority, e.g., an appropriate regulatory agency 245. The authority information source 520 or regulatory agency 245 may inform the autonomous vehicle 100 of the anomalies 484 via any of the methods of Centralized Distribution of Vehicle Imperatives, such as described below.

For example, in some embodiments, an external navigation information source 520 can describe specific regions 402 (e.g., mountain passes or narrow tunnels) in which the autonomous control system 110 is known to be incapable of reliably operating the autonomous vehicle 100. Upon or just prior to entering into such regions 402, the autonomous control system 110 can immediately detect or predict such an anomaly 484. In some system embodiments 200, the definition of these regions 402 can also include an instruction to the autonomous control system 110, indicating whether control should be passed 30 to the offboard panel of experts 235 or passed 44 to the driver USR.

In another example, the autonomous control system 110 may be informed of anomalous conditions 484 by a local information source 520 or authority 245 via a wireless communications channel 220. For example, upon entry into a parking facility, the operator (e.g., a human operator or an automated operator) of the parking facility may inform the autonomous control system 110 of an anomaly 484 (i.e., challenging parking conditions) and request that the autonomous control system 110 pass control to a local offboard panel of experts 235. In this case, the offboard panel of experts 235 can be a set of one or more remote operators, i.e., "harbor masters", that are tasked with efficiently and safely parking autonomous vehicles 100 within the parking garage. Government authorities 520,245 may similarly broadcast information regarding anomalies 484 to all autonomous vehicles 100 within a region 402 if unusual traffic patterns or safety hazards exist. As discussed below, in some embodiments, external information 520 can be communicated to the autonomous vehicle 100 in regard to a localized anomaly 484, e.g., a parking garage, an airport road network, etc., wherein the autonomous control system 110 is provided with localized information 520 with which to operate, e.g., a localized map, available parking spaces, controlled movement around an airport for ingress, passenger departure, passenger pickup, egress, etc.

Centralized Distribution of Vehicle Imperatives

Traffic laws are not consistent across the United States or even throughout a single state. For example, turning right on a red light is permitted in California (ref. "California Driver Handbook—Turns", California Department of Motor Vehicles, 2016 May 16, https://www.dmv.ca.gov/portal/dmv/detail/pubs/hdbk/turns), while it is prohibited in New York City (ref. "Right Turn on Red", New York City Department of Transportation, 2009, http://www.nyc.gov/html/dot/downloads/pdf/ssi09_rightonred.pdf). Similarly, speed limits and many other requirements are not consistent across government boundaries.

Regulatory agencies, e.g., 245, also frequently have vehicle requirements that are temporary. Some common examples of this include, limited lanes during construction time periods, school zone speed limits, or no parking on street cleaning days. Other one-time examples also exist, such as redirecting traffic during a particular event, or redirecting traffic around an accident.

Some illustrative embodiments of the systems and methods disclosed herein allow a regulatory entity 245 (FIG. 3) to push rules and requirements to autonomous vehicles 100, which the autonomous vehicles 100 are required to obey while operating within a corresponding regulated space 404.

Figure 11:
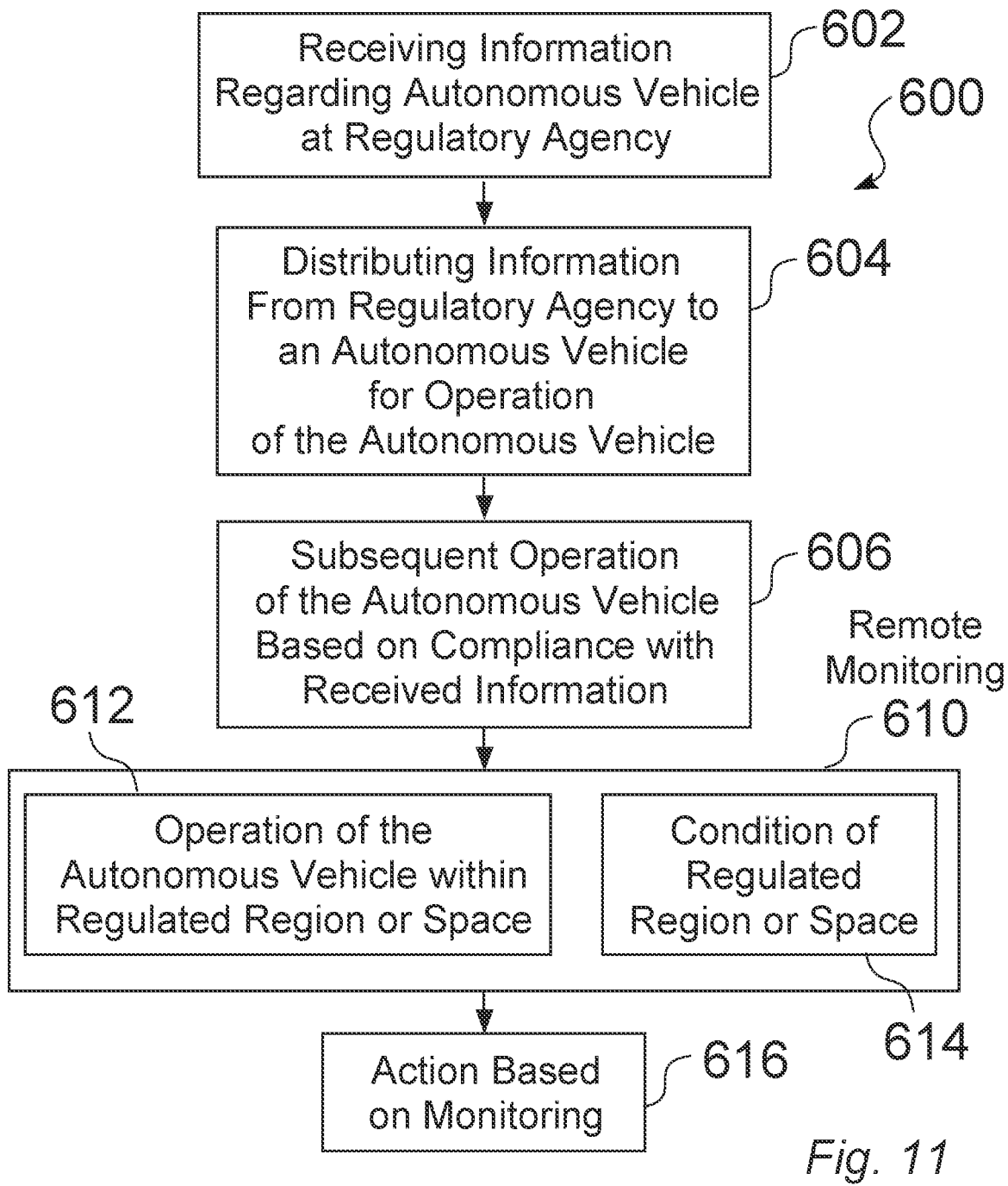
FIG. 11 is a flowchart of an illustrative method showing the wireless distribution of information, such as rules, regulations and/or requirements, from a regulatory entity to one or more autonomous vehicles, and subsequent monitoring.

FIG. 11 is a flowchart of an illustrative method showing the wireless distribution of information, such as rules, regulations and/or requirements, from a regulatory entity 245 to one or more autonomous vehicles 100, and subsequent monitoring 610 and/or actions 616.

In some embodiments, a regulatory entity 245 can be a government entity such as a state, county, city, or other municipality that has the authority and desire to regulate autonomous vehicles 100. The regulatory entity 245 has authority to define rules within its regulatory region 402 or space 404. In some embodiments, a regulated space 404 can be defined by a geographic boundary or by a fence or property line. In such cases, the regulatory entity 245 may be the property owner or their proxy.

In some illustrative embodiments the present invention, a regulatory entity 245 defines rules, e.g., 392 (FIG. 5) that apply to autonomous vehicles 100 that operate within the regulated space 404. When an autonomous vehicle 100 crosses into the regulated space, such as monitored 602 (FIG. 11), the autonomous vehicle 100 downloads the rules 392, such as received 604 from the relevant regulatory agency 245, and follows them 606 until it leaves the regulated space 404. Whenever an autonomous vehicle 100 is outside such a regulated space 404, the autonomous vehicle 100 is free to act on its own again, i.e., without being limited by the specific rules 392 that apply to the regulated space 404.

Some embodiments of such a method 600 and system 200 can be implemented in a manner similar to that of the Federal Aviation Administration system of traffic control. The autonomous vehicle 100 can be interrogated by the system 200 when it enters a regulated space 404, which allows for the regulatory entity 245 to ensure that the proper taxes or tolls have been paid, and that the rules are being followed. Some embodiments of such a system and method can be implemented to institute other regulations, such as weight or mileage fees, and/or alerts associated with any of vehicle condition, registration and/or emissions.

In some embodiments, these rules are distributed on a government only frequency or channel, such as any of a secure or private communication channel that does not permit public access, with security and encryption. While a communication channel or frequency that is separate from cellular internet isn't a requirement, it makes the system more robust against attacks, and adds a secondary communication channel 220, which can be disintermediated from the cellular network, e.g., 225. This can allow the system 200 to use national level encryption standards, to provide any of anti-jam capable, frequency agile, low probability of intercept, low probability of detection, low probability of jamming, and anti-spoofing technologies. In some embodiments, such a system can scan all of the known frequencies until it finds one that is being used.

The use of a separate frequency also allows for some embodiments 600 to be used as a civil event notification system. For instance, other electronic devices can monitor 610 the frequency for a special announcement, such as in the case of an emergency, e.g., an approaching accident, or an amber alert, which may cause the electronic device 616 to instruct a person on how to respond to the emergency. In an exemplary embodiment, an alert associated with a local crime or nearby suspect may allow interaction 616 with autonomous vehicles 100 and/or their occupants, to allow the live feeds of cameras, e.g., 116, to be accessed, recorded, and/or stored.

In some embodiments, other devices can also monitor 610 and broadcast on this network as well. For instance, in an illustrative embodiment, traffic and parking control devices can report data back to the centralized system 200, e.g., 235,245, for use in routing autonomous vehicles 100, or to be used to identify parking locations.

In some embodiments, upon entering a regulated space 404, an autonomous vehicle 100 can also receive a set of fall back or default rules, e.g., 378 (FIG. 5), to be used in case the communication system becomes unavailable. These commands 378 could instruct the autonomous vehicle 100 to follow the basic rules of the road. In some embodiments, the fall back or default rules 378 can also instruct all non-moving autonomous vehicles 100 to wait for a short period of time before embarking without a functional communication link 220.

Some embodiments of the system 200 and methods 10,600 can be funded through a number of different methods. In one instance, the system 200 can be paid for by levying a tax on any electronic device that utilizes the relevant frequencies. Alternatively, some embodiments of the system 200 and methods 10,600 can be funded by requiring payment to access restaurant, navigational, and traffic data 520. In some embodiments, the system 200 and methods 10,600 can request payment in order to give an autonomous vehicle 100 priority to get to a location faster.

The operation of the system 200 and methods 10,600 may be further understood using the following additional examples:

In one example, the system 200 may issue a command prohibiting non-autonomous driving in certain areas. For example, the diamond lane on the freeway may only permit autonomous carpools during certain times. This would allow tight packs, or platoons, of autonomous vehicles 100 to quickly travel down the freeway 130. In another example, a curfew could be established that prohibited non-autonomous driving past a certain hour of the night for safety.

In another instance, the system 200 and methods 10,600 can route traffic around an accident 484. In many cases, the alternative roadways 130 that are used to route vehicles around an accident are not capable of carrying the same number of vehicles. Some embodiments of such a system 200 and methods 10,600 can allow for intelligent routing, wherein each alternative route is allocated a certain percentage of the detoured vehicles 100, to decrease the likelihood of traffic jams on the alternative routes 130.

In another illustrative embodiment, traffic control during special events or construction can also become significantly easier. Such an embodiment can allow for a local traffic control officer to issue instructions to autonomous vehicles 100, regardless of what traffic lights or signs may indicate or say. For example, an officer can direct an autonomous vehicle 100 to travel through a red light.

In the case of a dangerous situation 484 such as a nuclear meltdown, a hurricane, a tornado, an earthquake, a police action, or a military operation, some embodiments of the system 200 and methods 10,600 can abandon certain driving norms to allow for an increased flow of traffic. For example, the width of lanes can be decreased to allow a four lane freeway to carry six lanes of traffic. Driving on the shoulder may also be permitted. In a worst case scenario, some embodiments of the system 200 and methods 10,600 can allow vehicles to drive onto a sidewalk, or force parked vehicles 100 off of the roadway 130, to make room for more traffic lanes, or to provide increased access for emergency vehicles.

In some embodiments, the autonomous vehicles 100 can be directed to drive in a pattern, such as a staggered pattern, in which the autonomous vehicles 100 can retain the ability to navigate between lanes, such as for ingress/egress, and/or merging. Such a pattern would also be helpful for integrating non-autonomous vehicles (e.g., cars/trucks/motorcycles and/or emergency vehicles), such that non-autonomous vehicles can merge in and out as needed.

In some embodiments, street cleaning can also be made significantly easier, as autonomous cars 100 parked in the path of a street cleaner can be commanded to move either to another location, or to drive around the block while the street cleaning is done.

High speed chases would also become significantly safer, as police could direct autonomous cars 100 ahead of the chase to exit the freeway, or pull to the side of the road 130.

In some embodiments, one or more property owners or managers can operate as regulatory entities 245 with regard to their corresponding properties. For example, the regulatory entity 245 may be a parking garage owner or a sports stadium. This local regulatory entity 245 transmits rules 392 to the autonomous vehicle 100 detailing how the autonomous vehicle is to operate on the property. These rules 392 may contain instructions on where to park, removing the need to have numerous people directing traffic at a sports stadium.

In some embodiments, the regulatory entity 245 can also direct the autonomous vehicle 100 to park in a manner that would otherwise not permit a vehicle to exit, such as parking vehicles 3-4 deep. The owner or driver of the autonomous vehicle 100 would then notify the regulatory entity 245 before they plan to leave the property. This would allow the regulatory entity 245 to instruct the various autonomous vehicles 100 to shuffle around to allow access to the owners autonomous vehicle 100. Alternatively, the property may track the autonomous vehicle owner's smartphone, and move the autonomous vehicle 100 when it detects that the owner is in the process of leaving the property.

Figure 12:
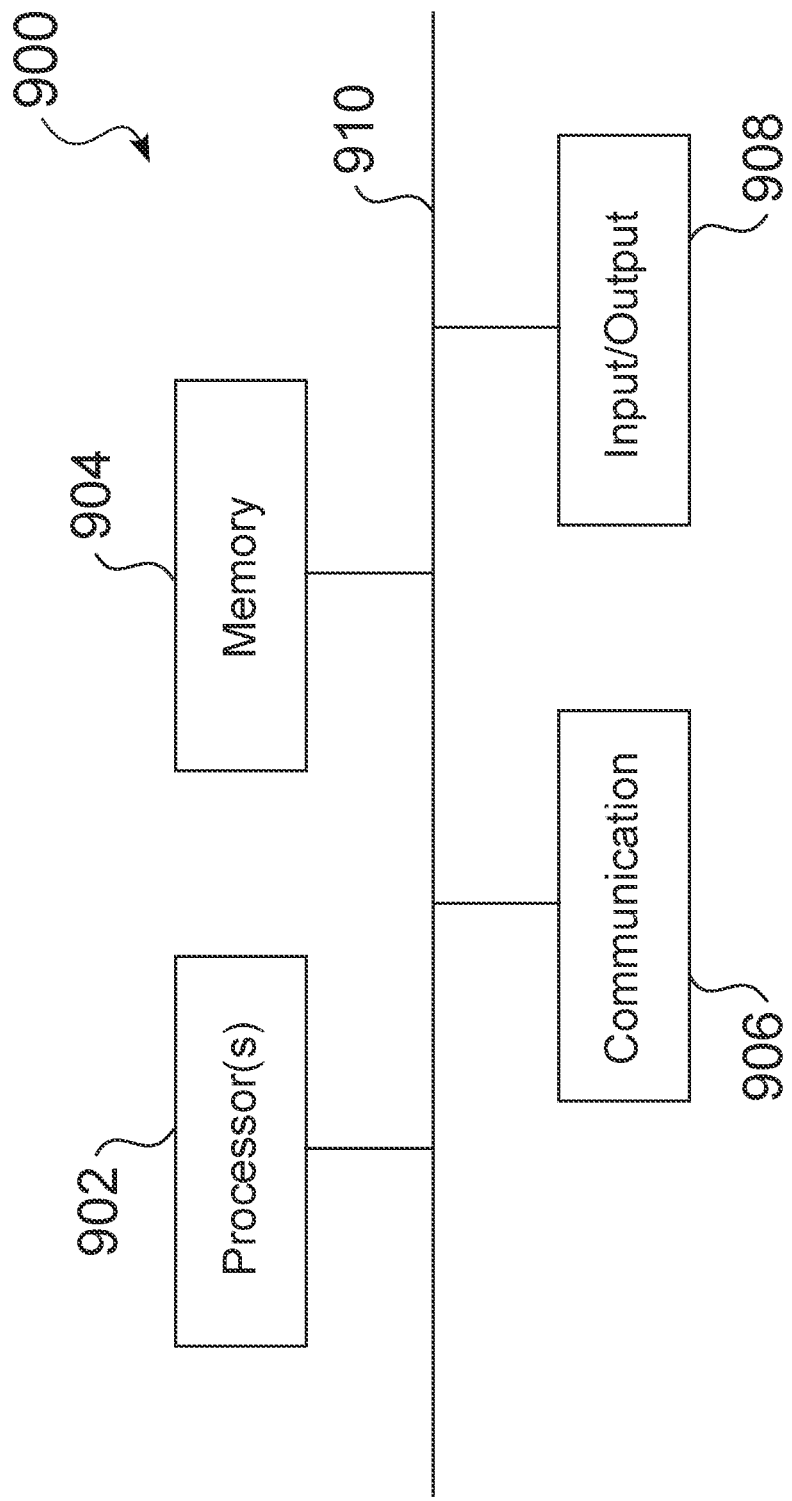
FIG. 12 is a high-level block diagram showing an example of a processing device that can represent any of the systems described herein.

FIG. 12 is a high-level block diagram showing an example of a processing device 900 that can be a part of any of the systems described above, such as the autonomous control system 110, the expert system 500 and/or node 502, the supervisory node 508, advisory nodes 512, or a system associated with regulatory entity 245. Any of these systems may be or include two or more processing devices such as represented in FIG. 12, which may be coupled to each other via a network or multiple networks. In some embodiments, the illustrative processing device 900 seen in FIG. 12 can be embodied as a machine in the example form of a computer system within which a set of instructions for causing the machine to perform one or more of the methodologies discussed herein may be executed.

In the illustrated embodiment, the processing system 900 includes one or more processors 902, memory 904, a communication device and/or network adapter 906, and one or more storage devices and/or input/output (I/O) devices 908, all coupled to each other through an interconnect 910. The interconnect 910 may be or include one or more conductive traces, buses, point-to-point connections, controllers, adapters and/or other conventional connection devices. The processor(s) 902 may be or include, for example, one or more general-purpose programmable microprocessors, microcontrollers, application specific integrated circuits (ASICs), programmable gate arrays, or the like, or a combination of such devices. The processor(s) 902 control the overall operation of the processing device 900. Memory 904 may be or include one or more physical storage devices, which may be in the form of random access memory (RAM), read-only memory (ROM) (which may be erasable and programmable), flash memory, miniature hard disk drive, or other suitable type of storage device, or a combination of such devices. Memory 904 may store data and instructions that configure the processor(s) 605 to execute operations in accordance with the techniques described above. The communication device 906 may be or include, for example, an Ethernet adapter, cable modem, Wi-Fi adapter, cellular transceiver, Bluetooth transceiver, or the like, or a combination thereof. Depending on the specific nature and purpose of the processing device 900, the I/O devices 908 can include devices such as a display (which may be a touch screen display), audio speaker, keyboard, mouse or other pointing device, microphone, camera, etc.

Unless contrary to physical possibility, it is envisioned that (i) the methods/steps described above may be performed in any sequence and/or in any combination, and that (ii) the components of respective embodiments may be combined in any manner.

The autonomous control system and corresponding methods introduced above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, or any device with one or more processors, etc.). For example, a machine-accessible medium includes recordable/non-recordable media, e.g., read-only memory (ROM); random access memory (RAM); magnetic disk storage media; optical storage media; flash memory devices; etc.

Those skilled in the art will appreciate that actual data structures used to store this information may differ from the figures and/or tables shown, in that they, for example, may be organized in a different manner; may contain more or less information than shown; may be compressed, scrambled and/or encrypted; etc.

Note that any and all of the embodiments described above can be combined with each other, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the examples disclosed herein. Accordingly, the specification and drawings are to be regarded in an illustrative sense rather than a restrictive sense.

What is claimed is:

1. A system for operating one or more autonomous vehicles, the system comprising:
    a transceiver for communication with the one or more autonomous vehicles over a wireless communication network;
    a communication link to an external processing system;
    a processor linked to the transceiver and to the communication link, wherein the processor includes instructions for:
    receiving information over the wireless communication network from an autonomous control system integral with a particular autonomous vehicle of the one or more autonomous vehicles, wherein the received information includes an anomaly detected by the autonomous control system, wherein the anomaly is based on received information monitored by the autonomous control system regarding any of an internal state of the particular autonomous vehicle and an environment in which the particular autonomous vehicle is operating;
    over the communication link:
    passing control of the particular autonomous vehicle to the external processing system; and
    transmitting information regarding the anomaly to the external processing system, wherein the external processing system is configured to allow a remote operator to:
    assess the anomaly based on the received information;
    resolve the anomaly based on the assessment; and
    over the wireless communication network, return the control of the particular autonomous vehicle to the autonomous control system when the anomaly is resolved.

2. The system of claim 1, wherein the anomaly includes any of an environmental condition or an attained internal state of the one or more autonomous vehicles when the autonomous control system is not able to ensure control of the one or more of autonomous vehicles within a predetermined level of uncertainty.

* * * * *